G. H. FRASER.
CRUSHING, GRINDING, OR PULVERIZING MACHINERY.
APPLICATION FILED JUNE 20, 1905. RENEWED FEB. 11, 1916.
1,205,613.
Patented Nov. 21, 1916.
13 SHEETS—SHEET 10.
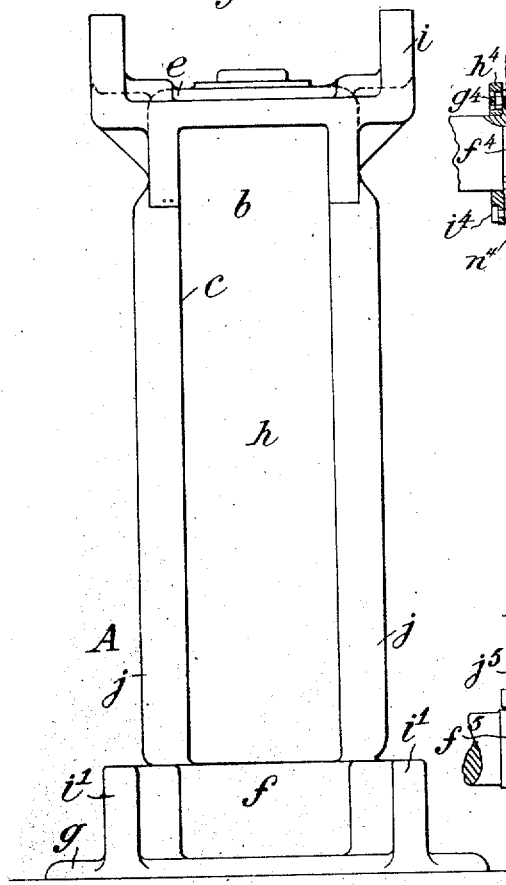
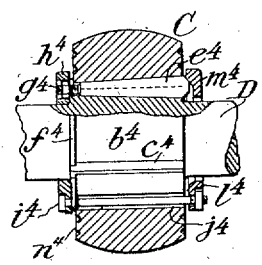
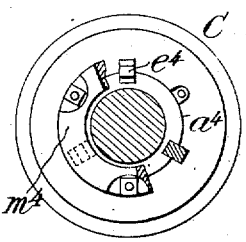
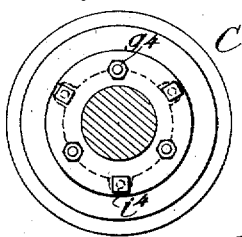
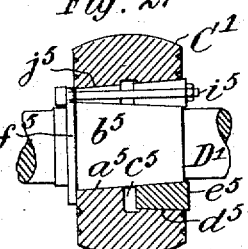
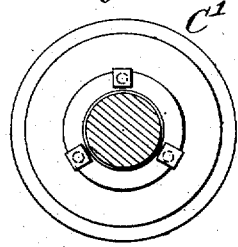
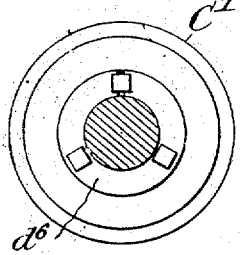
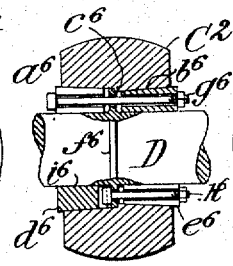
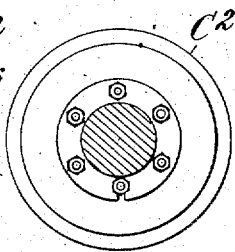
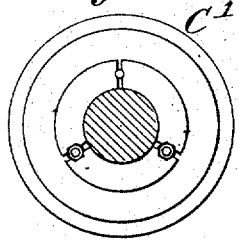
INVENTOR:
George H. Fraser,
By Attorneys,
WITNESSES:

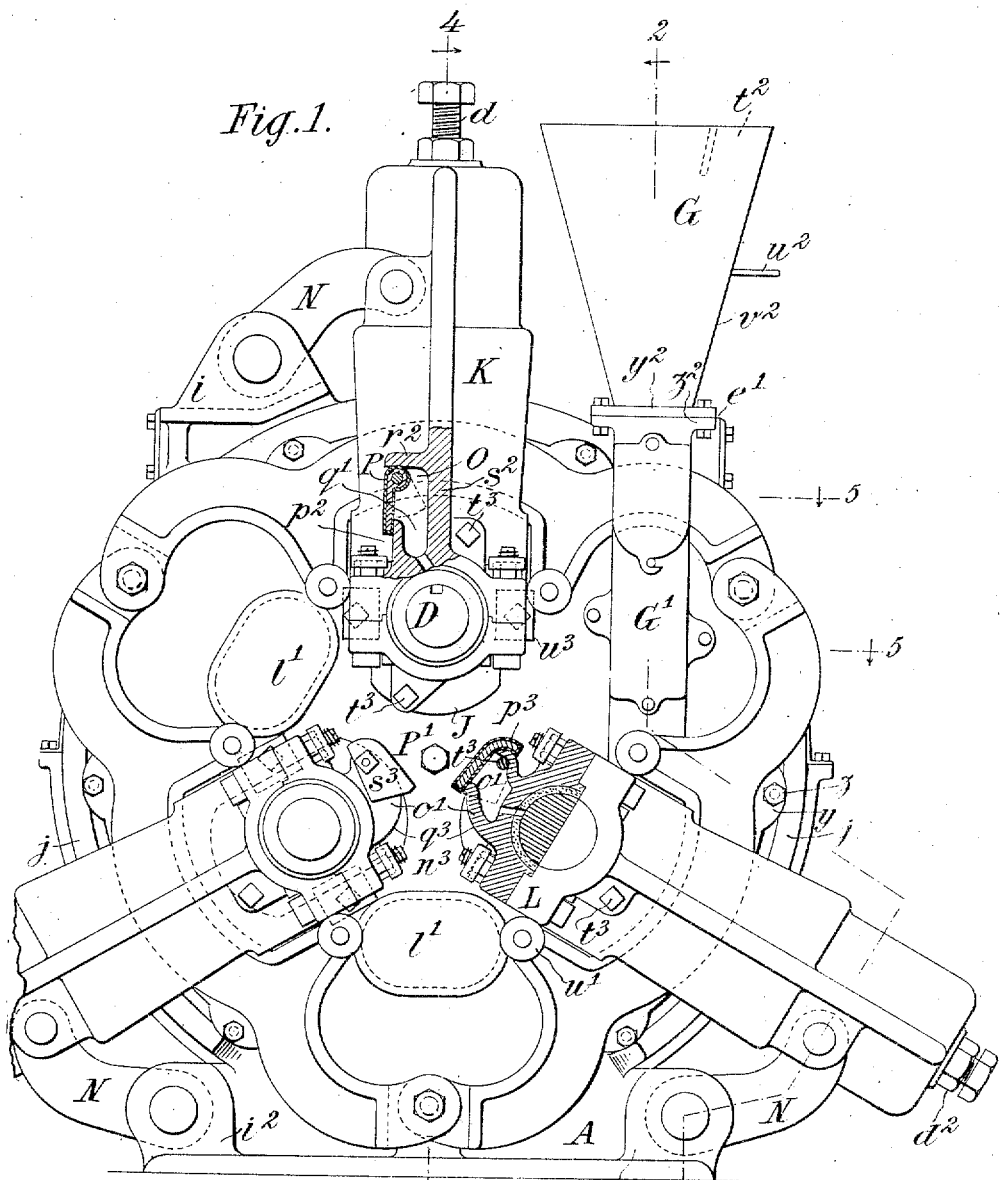
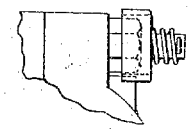
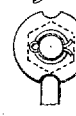

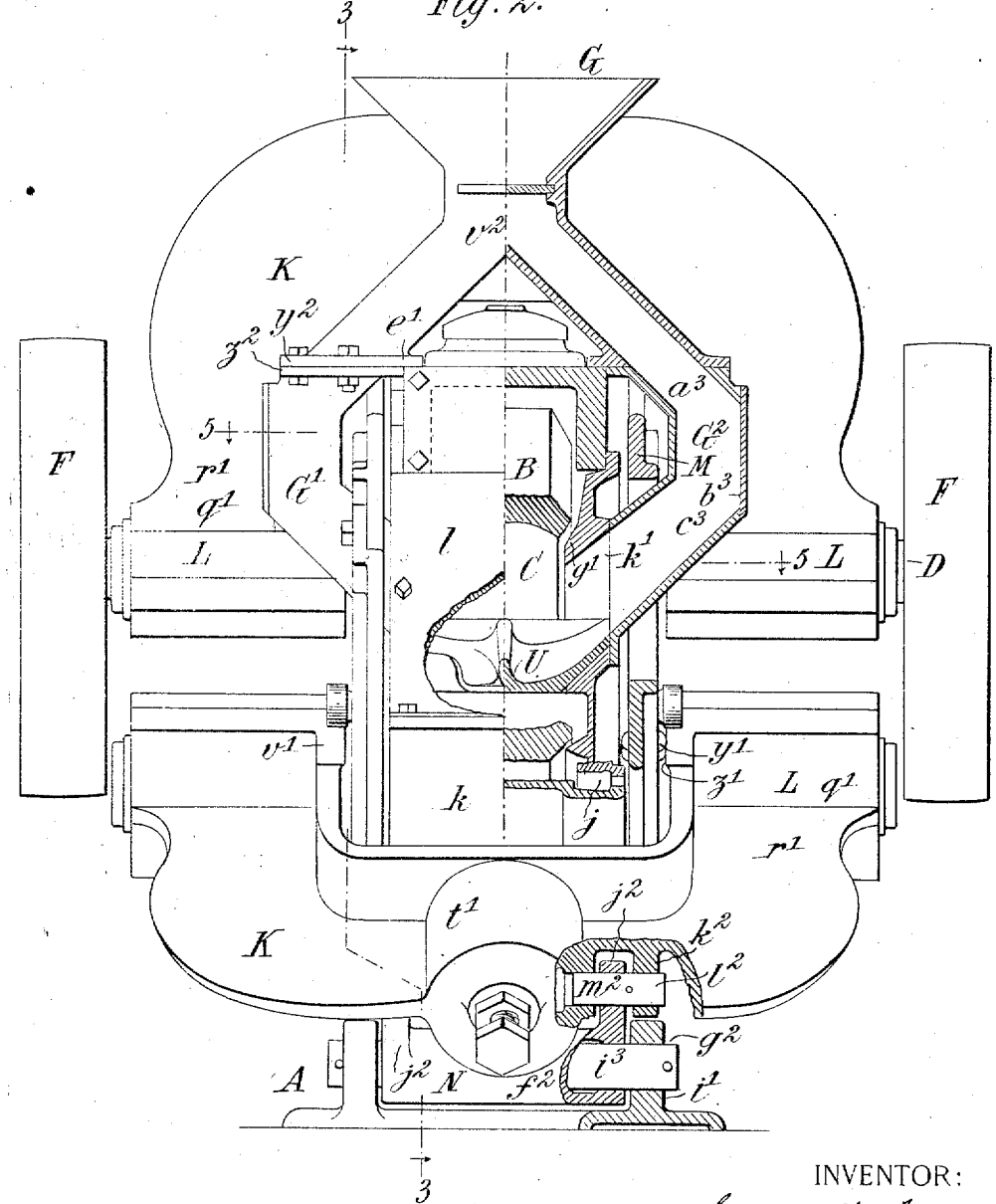

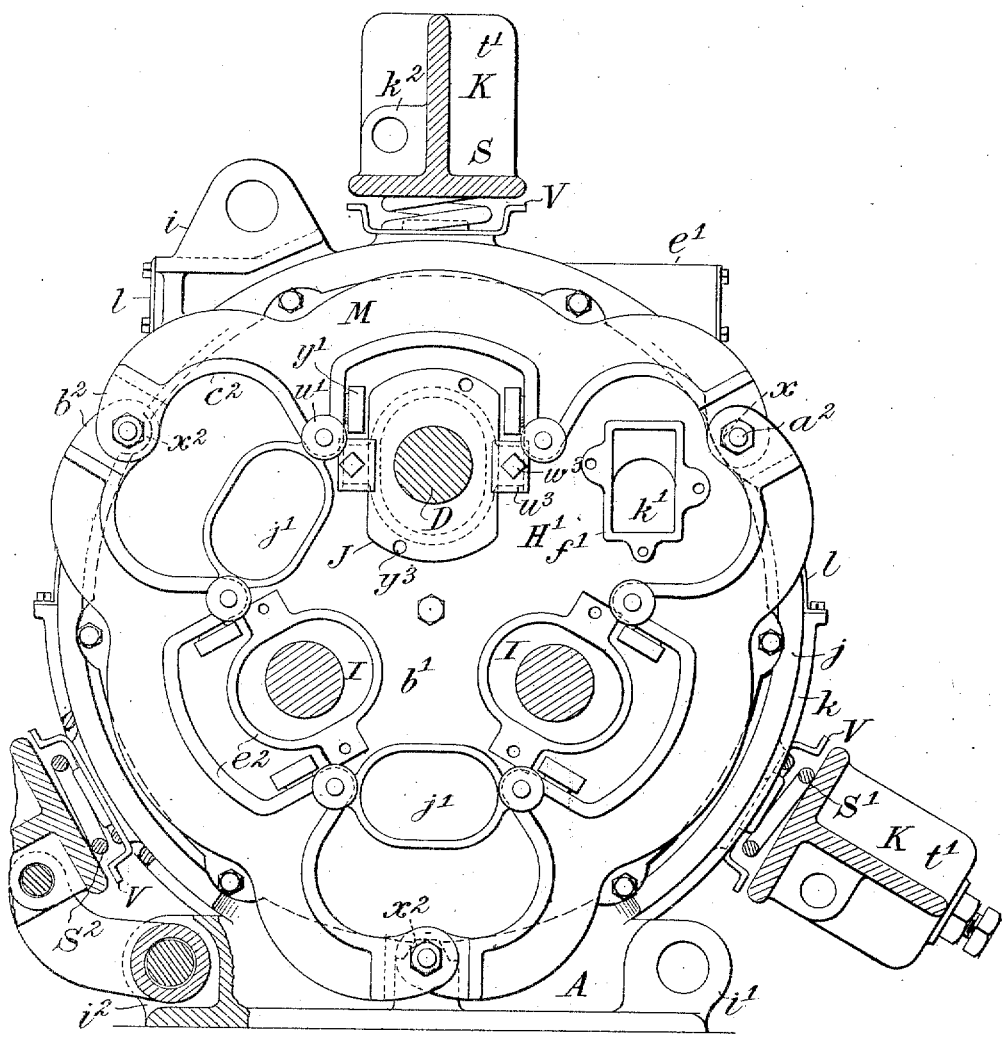

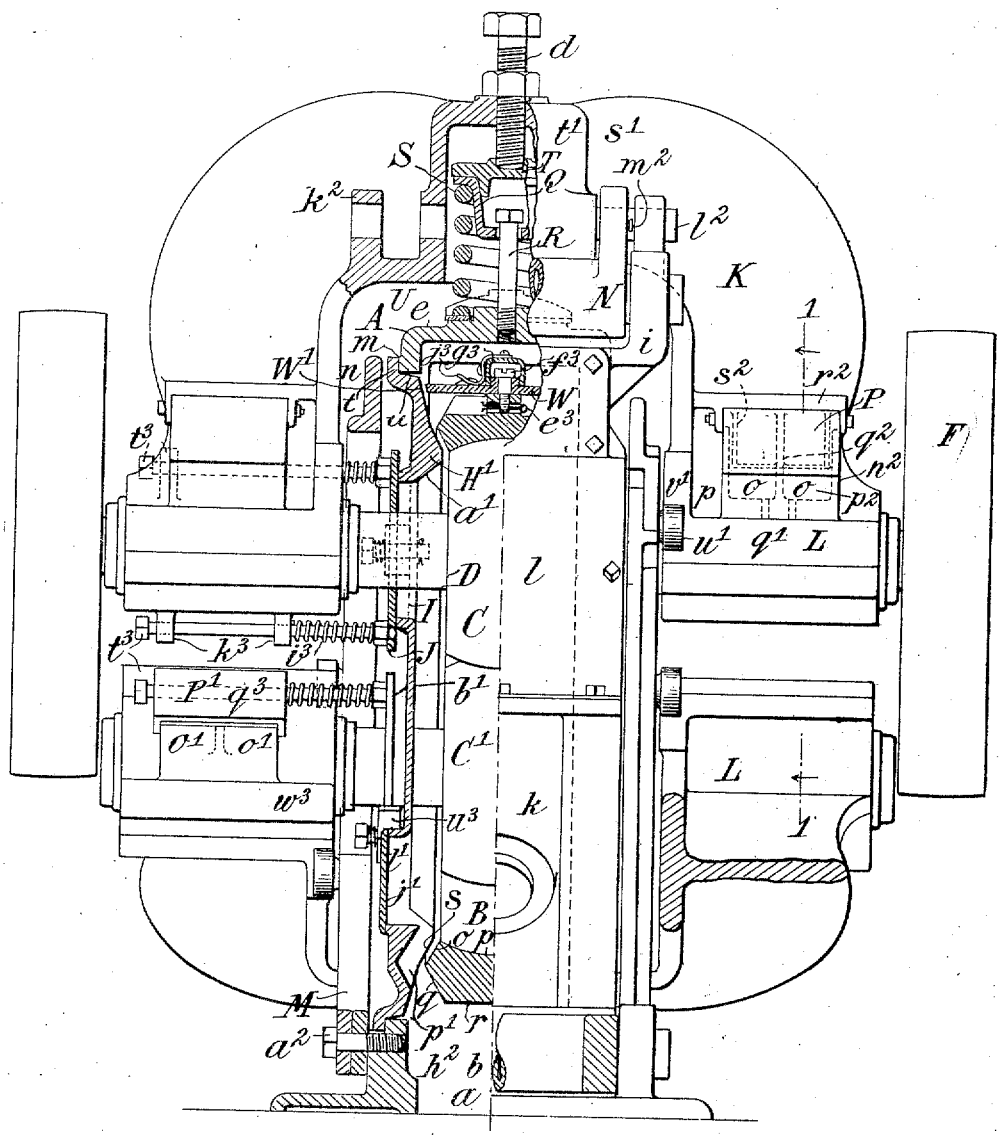

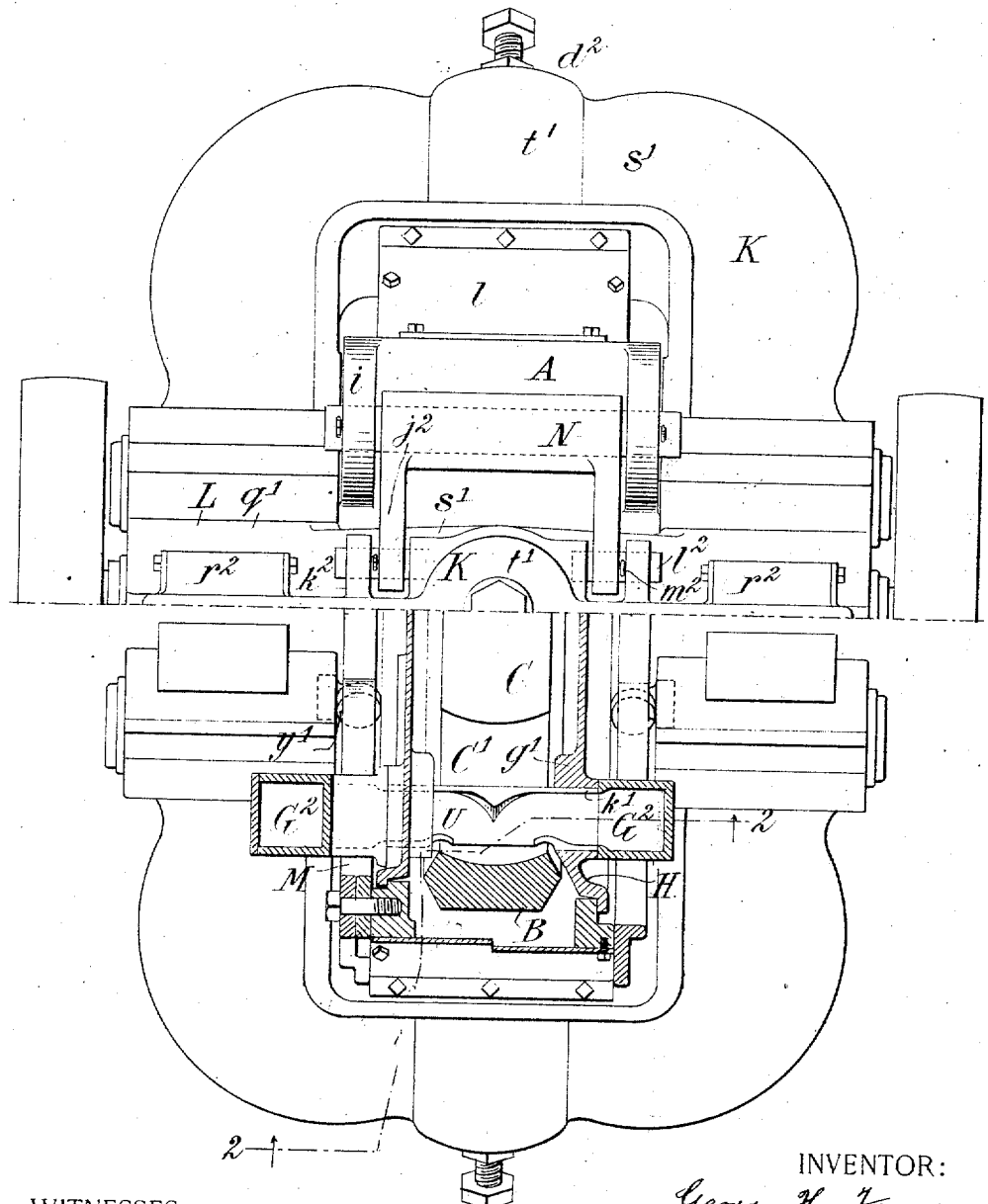

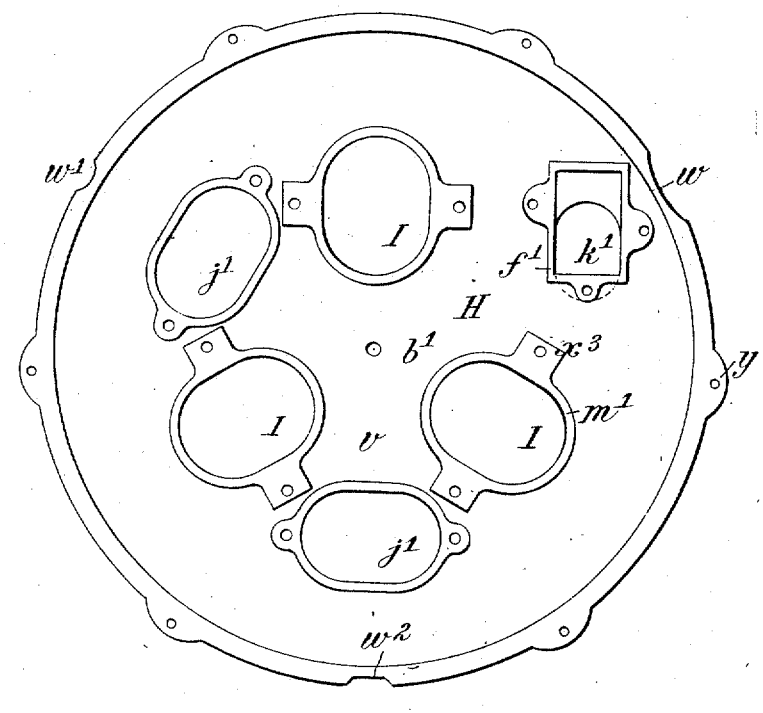
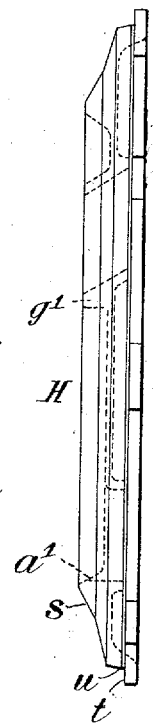
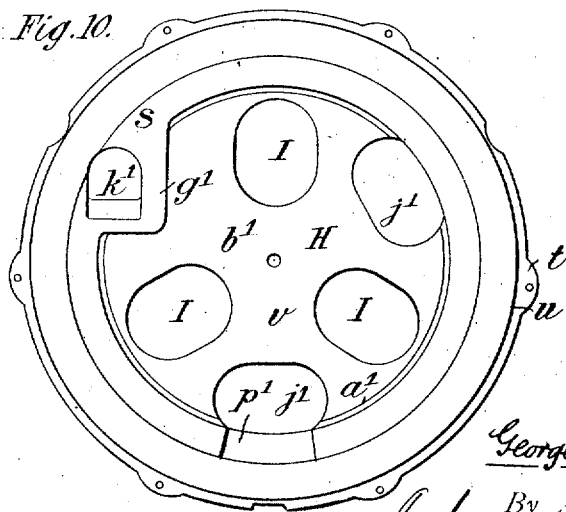

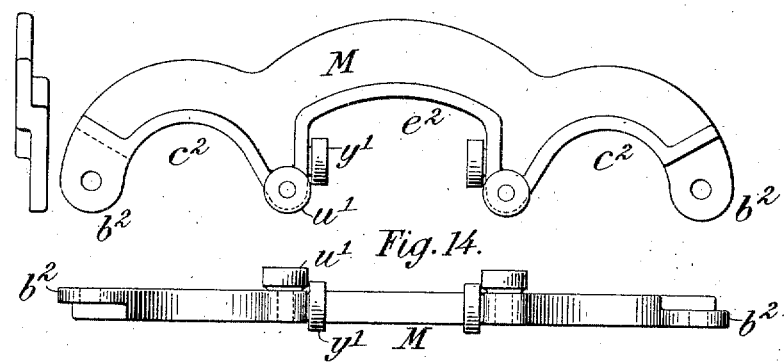

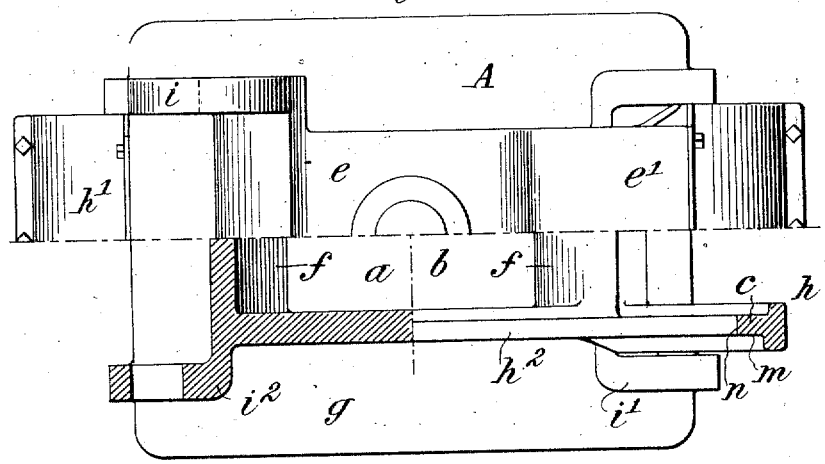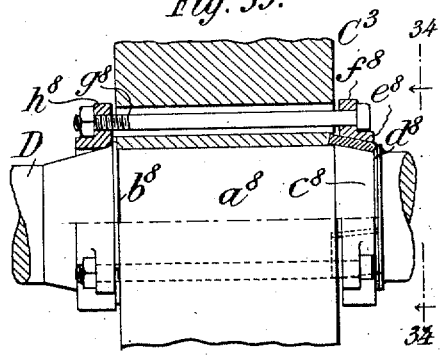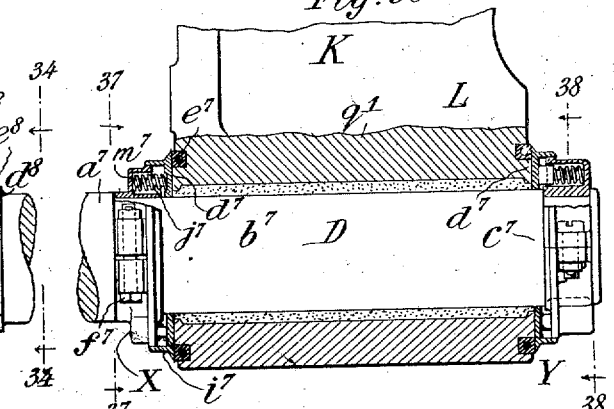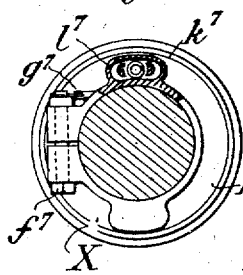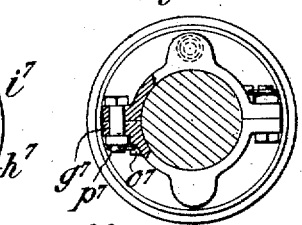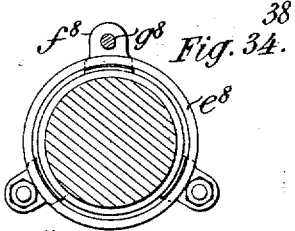

UNITED STATES PATENT OFFICE.

GEORGE H. FRASER, OF NEW YORK, N. Y.

CRUSHING, GRINDING, OR PULVERIZING MACHINERY.

1,205,613.  Specification of Letters Patent.  Patented Nov. 21, 1916.

Application filed June 20, 1905. Serial No. 266,156. Renewed February 11, 1916. Serial No. 77,798.

*To all whom it may concern:*

Be it known that I, GEORGE H. FRASER, a citizen of the United States, residing in the borough of Brooklyn, county of Kings, city and State of New York, have invented certain new and useful Improvements in Crushing, Grinding, or Pulverizing Machinery, of which the following is a specification.

This invention relates to machinery for crushing, grinding or pulverizing materials, such for example as machines for this work having a revolving annular die, and one or more internal crushing rolls bearing against the inner face of the die to crush the material between the roll and die faces.

The invention aims to provide various improvements in crushing machinery, and to provide an improved machine of this general type.

To this end in carrying out this invention in its preferred form, improved means are provided for carrying the roll shafts, improved means for guiding the rolls, improved means for supporting the roll bearings, an improved casing construction, and various other improvements, all of which will be hereinafter more fully set forth.

Figure 6:
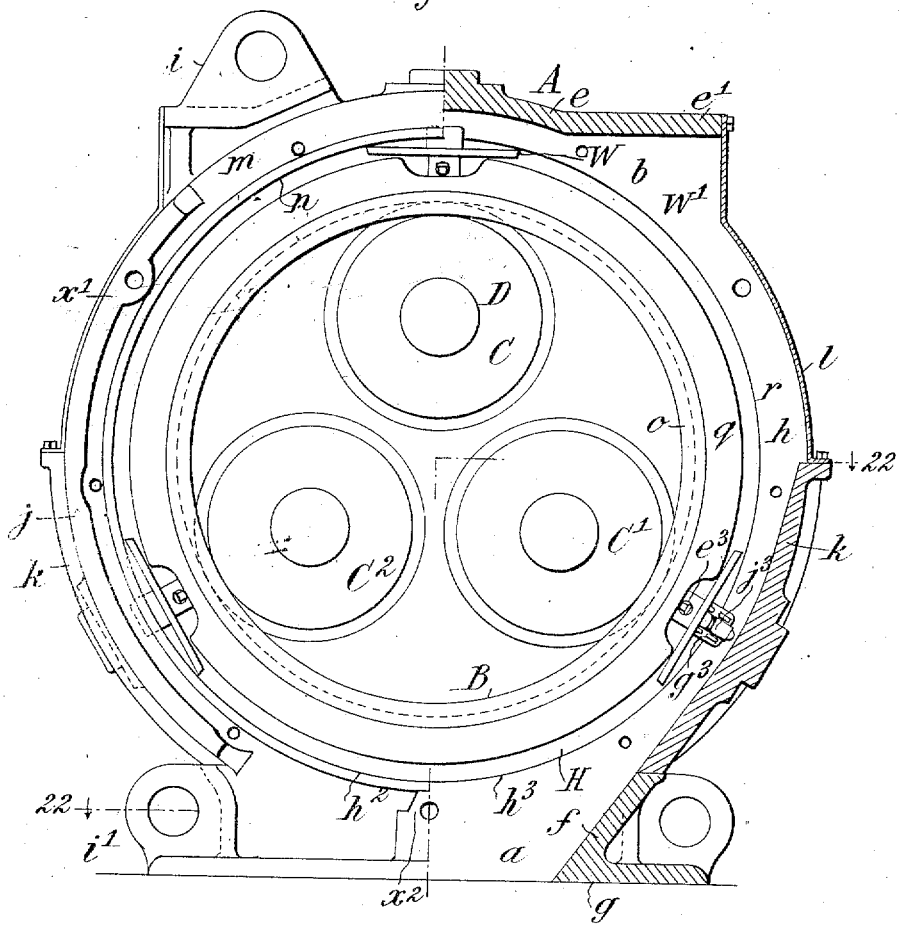
Figure 7:
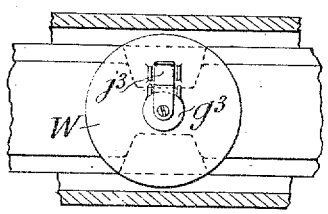
Figure 40:
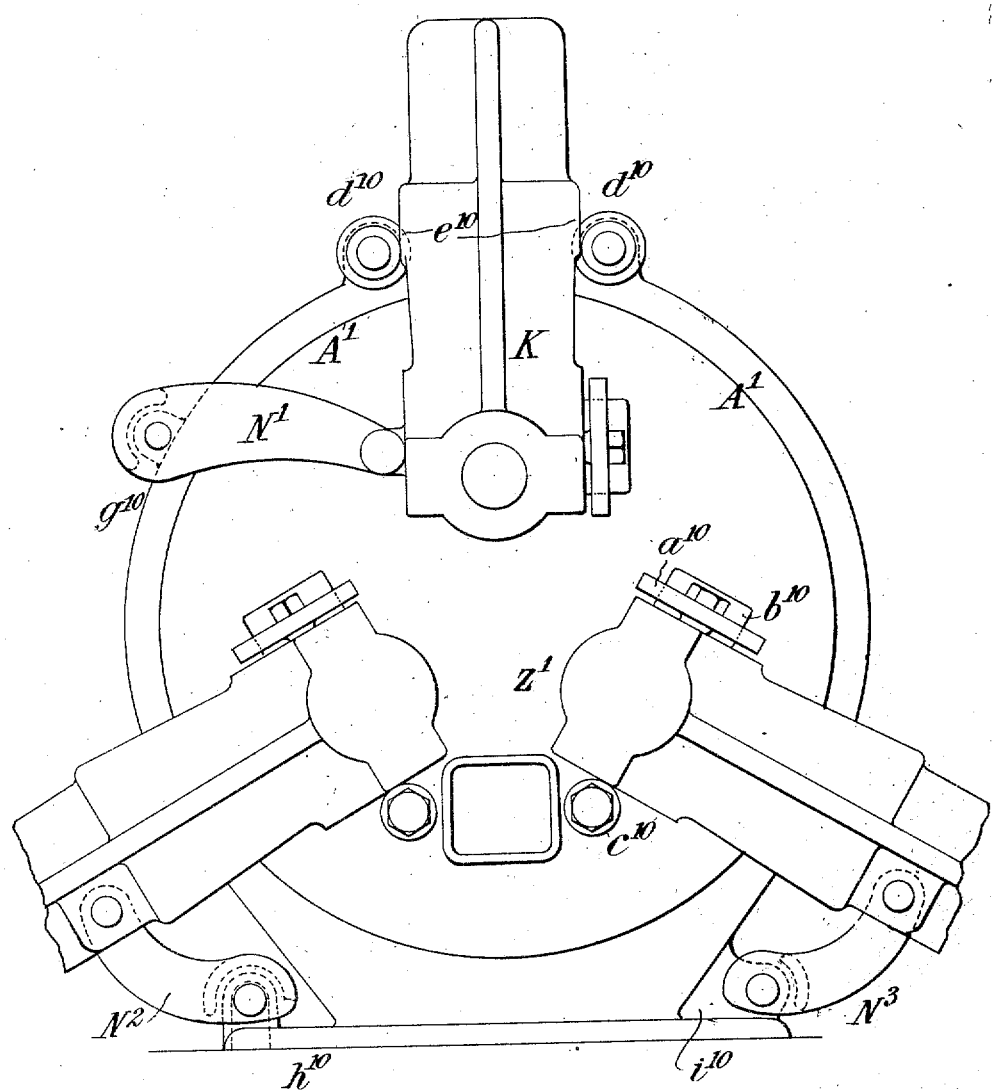
Figure 41:
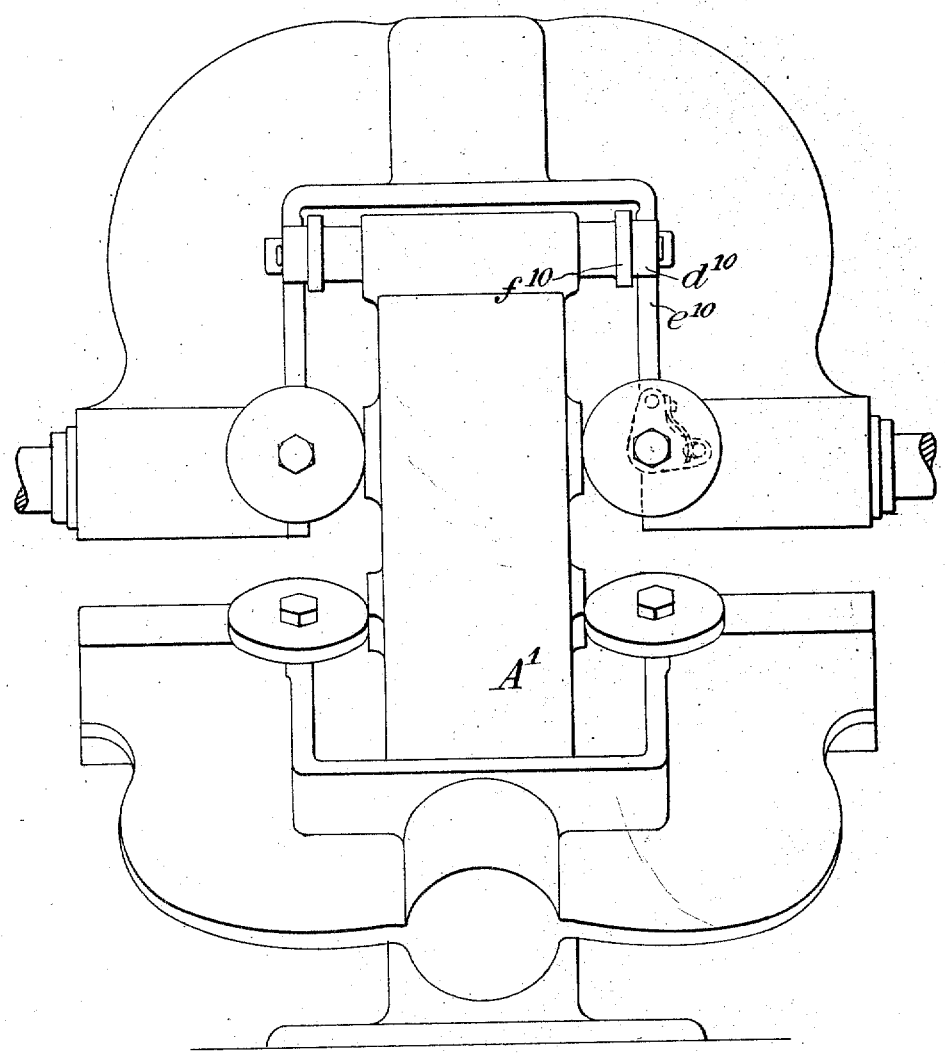
Figure 42:
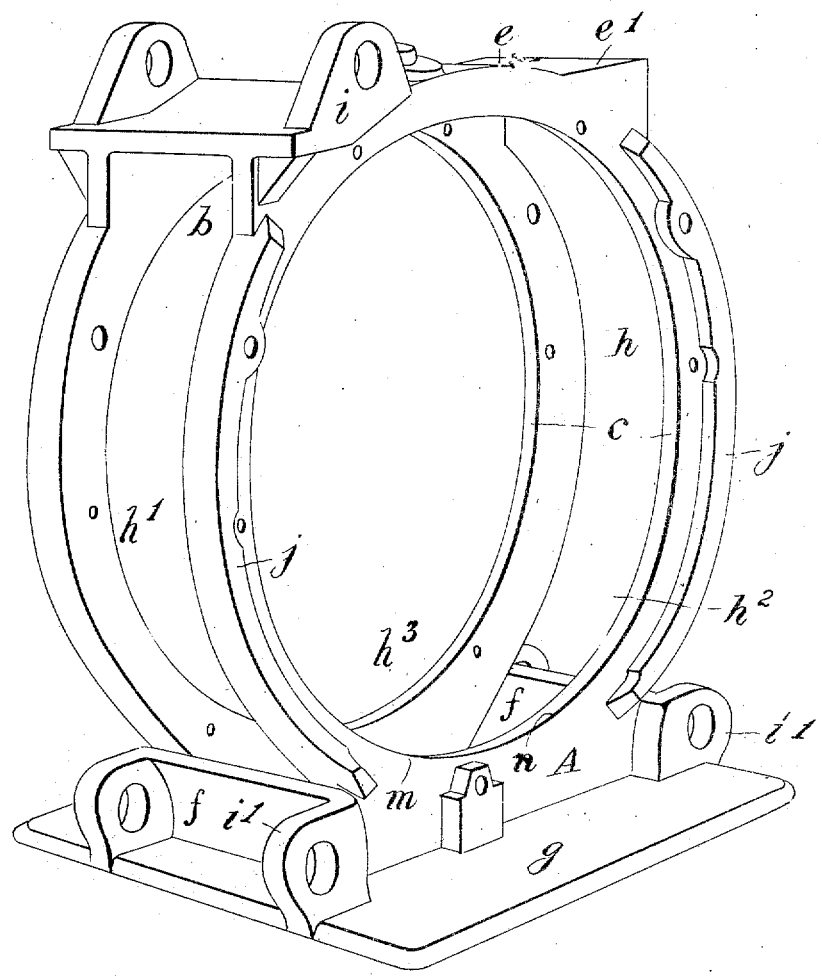

In the accompanying drawings which illustrate the preferred form of my invention as applied to a pulverizing mill of the type above referred to, Figure 1 is a side elevation partly in vertical section through one of the oil wells, on the line 1—1 in Fig. 4; Fig. 2 is a front elevation thereof, one side being in vertical section through the feed chute, the section being cut approximately on the line 2—2 in Fig. 1 and looking in the direction of the arrow; Fig. 3 is a side elevation of the casing similar to Fig. 1 showing it and the other parts of the machine partly in section on the planes of the lines 3—3 in Fig. 2; Fig. 4 is a rear elevation partly broken away and partly in vertical mid-section cut on the plane of the line 4—4 in Figs. 1 and 3 looking in the direction of the arrow; Fig. 5 is a plan view partly in horizontal section on the planes of the lines 5—5 in Figs. 1 and 2; Fig. 6 is a side elevation of the casing partly in vertical longitudinal mid-section; Fig. 7 is a fragmentary sectional view showing the ring guiding rollers; Fig. 8 is an outside elevation of the cheek-piece alone; Fig. 9 is an edge view thereof; Fig. 10 is an inside elevation thereof; Fig. 11 is an outside elevation of one of the side guide bars; Fig. 12 is a view of one end thereof; Fig. 13 is a view of the other end thereof; Fig. 14 is an edge view thereof; Fig. 15 is an inside view of one of the spring plates alone; Fig. 16 is an edge view thereof; Fig. 17 is an outside elevation thereof; Fig. 18 is a cross-section thereof; Fig. 19 is an outside elevation of one of the feed chutes alone; Fig. 20 is a front elevation thereof; Fig. 21 is an inside elevation thereof; Fig. 22 is a plan of the casing partly in horizontal section on the lines 22—22 in Fig. 6; Fig. 23 is an end view thereof; Fig. 24 is a fragmentary section showing the top roll fastening; Fig. 25 is a view of one face thereof; Fig. 26 is a view of the other face thereof; Fig. 27 is a fragmentary section showing the feed roll fastening; Fig. 28 is a view of one face thereof; Fig. 29 is a view of the other face thereof; Fig. 30 is a fragmentary section showing the rear roll fastening; Fig. 31 is a view of one face thereof; Fig. 32 is a view of the other face thereof; Fig. 33 is a fragmentary view of a modified roll fastening; Fig. 34 is a cross-section thereof; Fig. 35 is a fragmentary section of another modified roll fastening; Fig. 36 is a fragmentary section of one of the bearings showing the dust-excluding thrust collars; Fig. 37 is a cross-section thereof on the line 37—37; Fig. 38 is a cross-section thereof on the line 38—38; Fig. 39 is an enlarged fragmentary section thereof; Fig. 40 is a side elevation of a modification; Fig. 41 is a front elevation thereof; and Fig. 42 is a perspective view of the casing alone, looking at its rear edge and left side. Figs. $1^a$ and $1^b$ are each respectively plan and side views of a detail portion of the device.

Referring to the drawings, A is the casing, B is the ring or die, C, $C^1$ and $C^2$ are the rolls, S, $S^1$ and $S^2$ are the crushing springs, and $d$, $d^1$ and $d^2$ are the adjusting screws.

The casing incloses and supports the ring and rolls. The top roll preferably carries the ring by acting against its inner face, and the other rolls press outwardly against the inner face of the ring to crush the rock between their peripheries and such face. The pressure against the ring may be adjusted by the springs and adjusting screws. The ring and rolls are driven by any suitable means, as for example by a driving pulley F on the top shaft D, which causes the roll C to revolve on its axis and drive the ring B by traction from the roll.

G is the hopper, and G¹ and G² are the feed chutes.

Rock enters the hopper and falls through the chutes at the opposite sides of the mill on to the inner face of the ring in front of the feed roll C¹. The rock revolves with the ring and passes the rolls, by which it is crushed against the face of the ring. The crushed rock flows off the sides of the ring and falls out through a discharge opening $a$ in the bottom of the casing. The ring runs sufficiently fast to cause the rock to stay on its inner face under the influence of centrifugal force until the rock is pulverized and forced off this face by the rolls. The inner face of the ring is concave, and the outer face of each roll is convex, so that the ring is guided by the rolls and tracks on them like a belt on a pulley. The rock on the inner face of the ring causes the rolls to move in and out against the tension of the springs. The ring preferably is free to move axially a short distance, but is prevented from excessive movement by checkpieces H H¹ at its opposite sides, the space between them and the ring being sufficient to permit the crushed rock to escape, and being small enough to prevent large pieces from falling through.

According to one feature of improvement I construct the casing A as a ring-like or tubular member open at its front and rear edges, and preferably also at one or both sides, such openings being preferably of larger diameter than the outer diameter of the ring, so that the latter can be removed or inserted through the front or rear openings, and it and the rolls can be removed or inserted through either of the side openings. Preferably the casing is constructed as a single annular casting, partly of trough-like cross-section and partly of L-shaped cross-section, and having an internal crushing chamber $b$, thick side flanges $c$ connected at the top by a cross-wall $e$ and at the bottom by cross-walls $f$ at front and rear, and by the base $g$ through which the outlet opening $a$ communicates with the chamber $b$. A front hole $h$ (see Figs. 6, 23 and 42) of greater height and width than the ring B is provided through the front wall of the casing; a similar hole $h'$ is provided through the rear wall, and circular holes $h^2$ $h^3$ are provided through the side walls, so that when necessary to remove or replace it the ring may be passed through any of these holes, which will be afterward closed by suitable plates or covers. At its front the top wall $e$ is faced at $e^1$ to carry the feed hopper and at its rear it is formed with one or more lugs or projections $i$ for supporting or guiding the bearing frame of the top roll. Near the base the casing is provided with one or more integral lugs $i^1$ at front and rear for supporting or guiding the bearing frames of the lower roll. On each side the casing is reinforced by a lateral flange $j$, which is preferably interrupted near the top and bottom beyond the extremities of the front and rear holes, and which serves to strengthen the casing between its solid top wall and its face throughout the portion traversed by these holes. This flange is arc-shaped and preferably concentric with the axis of the casing.

To close the lower parts of the end holes $h$, a plate $k$ is provided which is preferably a removable spring plate for taking the pressure of the roll springs, and extends from the center of the casing down to the end of the hole. The upper part of the hole is preferably closed by a sheet-iron plate $l$, which is bolted to the top of the spring plate and extends thence upwardly and is bolted to the top wall $e$, the front of which is faced off to make a tight joint with it. Preferably the outer face of the flange $j$ is turned off true, and the inner face of each plate $k$ is machined to make a tight joint, and to facilitate this the flange is projected outwardly sufficiently to permit a boring machine tool to finish its face, and is of such radius that such tool will clear the other projecting parts of the casing when cutting this face. The lugs $i$ $i^1$ are sufficiently separated from the flange $j$ to provide for this.

The sides of the casing are provided with a circular smooth face $m$ adjacent to and surrounding the side openings, and are preferably bored with an outer shoulder $n$ at the outer edge of the side openings against which the side covers may be clamped.

The ring B is of improved construction in that it has outwardly inclined or diverging conical side faces $o$ at its opposite sides extending outwardly from its concave inner face $p$, and preferably terminating at inwardly inclined or reverse conical faces $q$ extending from the faces $o$ outwardly to the outer wall $r$ of the ring. The flaring faces $o$ reinforce the edges of the ring and prevent them from turning over or chipping off.

An improved check-piece H¹ is provided opposite the sides of the ring. These pieces are preferably right and left hand, and have conical contact faces $s$ substantially identical in their outward inclination with and parallel to the outer flaring faces $o$ of the ring. These faces are preferably hardened and are disposed opposite the ring, the check-pieces being preferably formed each as a single disk-like or circular member or casting having a wide body portion extending outwardly through the adjacent side hole in the casing, and having an outer flange $t$ turned off to fit against the face $m$ of the casing, and an adjacent shoulder $u$ fitting the bored shoulder $n$ of the casing (see Figs. 4, 9 and 10). The body $v$ of each cheek-piece is preferably a soft casting, cup-shaped on its exterior, and has the approximate form of a truncated hollow cone extending from the exterior to the interior of the casing. On its outer edge it is formed with one or more, preferably three, dissimilar guiding provisions $w$, $w^1$ and $w^2$ engaged with similar provisions $x$, $x^1$ and $x^2$ on the casing to insure that the cheek-piece can only be applied to the casing in proper position. These provisions are preferably notches in the cheek-piece and lugs formed on the inner faces of the flanges $j$, the notch $w$ and lug $x$ being shown as arc-shaped and as narrower than the opposite arc-shaped notch $w^1$ and lug $x^1$, and the notch $w^2$ being shown as V-shaped or angular and fitting the projection $x^2$ which is similarly shaped. Between these provisions each cheek-piece is formed with attaching portions $y$ by which it can be attached to the casing by screws $z$ screwing through the flange $e$ of the latter.

According to another feature of improvement the cheek-piece constitutes the side covering of the casing, for which purpose it is formed with a closed center or wall $b^1$, which closes the space within its contact face, and is provided with slots or openings I (see Fig. 3) for the shafts, and with one or more hand holes $j^1$, two being shown. Surrounding its center it is formed with an annular internally beveled portion $a^1$, which deflects inwardly on to the ring any rock which flies outwardly against the wall $b^1$. I construct the cheek-piece in its preferred form with a concave outer face, and with an outer flange $m^1$ surrounding each shaft hole, and with a feed hole $k^1$ at its front through which the feed chute discharges, and with an outer flange $f^1$ surrounding this hole, and finished off to make a tight joint with the adjacent tubular end of the feed chute which is fastened against it. The flanges $m^1$ surrounding the shaft slots are faced off and receive the dust guard J. The cheek-piece is cut away at its lower side at $p^1$ to permit escape of any uncrushable object that may get between it and the ring. The taper of its wall at this point is greater than that of the face $o$ of the ring, so as to give a gradually widening space to facilitate the escape of any substance getting between the faces of the ring and cheek-piece, and the angle of the entire contact face of the cheek-piece may be likewise constructed, as is shown, for the same object. On its inner side the cheek-piece is formed with an inwardly projecting flange or portion $q^1$ surrounding the feed opening $k^1$ inwardly of the contact face, thus bringing the inner edge of this opening in close proximity to the ring. The opening $k^1$ is high enough to bring its outlet above the adjacent portion of the feed roll, and I prefer to use the spout piece or deflector U which fits in the opening $k^1$ and extends across to the opening in the opposite cheek-piece, and has a channel or trough portion receiving the down-flowing feed and directing it inwardly over the roll, and then downwardly against the inner face of the ring near the center of the latter, and just above the roll, thus preventing feed from falling at the side of the roll. The hand holes $j^1$ may be closed by hand plates $l^1$ as shown.

I provide improved means for carrying the rolls, preferably non-rotative movable pivotally mounted members disposed at opposite sides of the casing, these consisting of a frame K, preferably a single U-shaped casting straddling the casing and having bearing ends $q^1$ at its extremities, web-shaped legs $r^1$ extending from these outwardly, a cross portion $s^1$ connecting these legs and having a spring pocket $t^1$ for inclosing the pressure spring. This frame holds the bearings in alinement and transmits the tension of the spring to them.

I provide improved means for guiding and supporting the inner end of this frame, consisting preferably of separable members as bars or plates fastened to the casing near their extremities and engaging the legs of the frame near their centers, which preferably both hold the frame in position against movement transversely of the ring in resisting end pressure of the shafts, and also against displacement in the direction of rotation of the ring, so that they permit the frames to move in and out approximately radially of the ring, but prevent other movement. These bars are shown as ribbed castings M having ways receiving the bearing heads of the frames and guiding them. The bars are shown as provided with rolls $u^1$ acting against the edges $e^1$ of the frames to prevent transverse movement of the latter, and with rolls $y^1$ acting against the inner ends $z^1$ of the bearings, so that the bearings can roll against the frame, but are preserved in position relatively to the casing. The bars M are fastened at their outer ends to the casing by screws $a^2$ which screw into the casing opposite the projecting lugs $x$, $x^1$ and $x^2$ thereof respectively. The ends $b^2$ of the bars are in different vertical planes, so that while one end is against the casing the other end is against the end of the next bar, and they thus overlap each other when in position. Between their ends and their guiding portions the bars are preferably constructed with an outwardly curved or recessed portion $c^2$ so that they clear the feed chutes, and also the hand holes $j^1$. At their center they are recessed at $e^2$ to clear the bearings, the rollers being fastened on projecting portions substantially in alinement with their extremities, so that the lines of thrust are approximately coincident with the line of support.

My invention also provides improved means for guiding and supporting the outer parts of the bearing frames, these being pivotal supports N which are members pivotally connected preferably to the casing at one end and to the frame at the other end respectively, and which, as shown, swing on their pivotal connections participating in the movements of the frame radially, but resist tendency of the frame to rock laterally. The supports or members N are preferably U-shaped castings fitting between and hinged to the adjacent lugs $i$, $i^1$ and $i^2$ respectively on the casing, and having a tubular center $f^2$ which is bored to coincide with the bore $g^2$ through an attaching lug on the casing, and to fit a pivotal pin $i^3$ for connecting the parts together. From the center two arms $j^2$ project outwardly and have drilled ends which are fulcrumed to the adjacent end of the frame K, preferably by being fastened between a lug $k^2$ cast on the latter and the adjacent spring pocket, by a pin $l^2$, there being sufficient clearance between these to permit a cotter-pin $m^2$ to be passed through the pin $l^2$ to hold it in place. This connection insures that the bearing frame shall move in parallelism with the axis of the casing, and for the lower frames the angle of the pivotal connection is preferably such that the weight of the frame tends to force it outwardly, thus adding this tendency to the effective power of the spring when the latter is used, or making it possible to use the weight of the frame alone for generating the crushing force. The action of the members N for the lower rolls is similar to a toggle action, and its effect depends on the relative angularity of the pivotal connection which is adopted.

According to another feature of improvement the top frame is formed with integral wells O adjacent to each bearing for lubricating it. As shown, these wells are formed by casting against the web of the frame, side walls $n^2$, a front wall $p^2$, an intermediate partition $q^2$, and an overhanging flange $r^2$. The opening through the front wall is closed by a cover P, which closes both wells and is hinged to the side walls beneath the flange $r^2$, and has wings $s^2$ near its ends which preferably pass into the wells to keep dust from floating in at the ends of the cover when it is opened. The cover is surrounded by felt to make a tight closure. Grease can be put in one side of the partition and oil in the other side, and each will feed down through the communicating hole to near the center bearing.

According to another feature of improvement the lower bearings are provided with oil wells $O^1$, which are cast integrally with the caps and closed by covers $P^1$. These wells have an upwardly curved bottom wall $n^3$ and an upwardly reverse curved top wall $p^3$, which wells are connected by the side walls $r^3$ and shaped to give a suitable depth and contour to the oil wells within them to properly hold lubricant therein. The opening at the front of the wells is on an angle, and the cover $P^1$ rests on this by gravity, being hinged near its upper edge by a bolt so that it can be tilted to open the wells. These wells are partitioned by an intermediate wall $q^3$ to make the necessary number of compartments. The cover has side flanges $s^3$ which embrace the side walls to prevent dust from floating in at the ends of the cover. The cover is round at its upper edge and overlaps the upper wall to prevent dirt from sifting in at the top, and the cover is wrapped with felt as described for the cover P. The bolt $t^3$ which hinges the cover $P^1$, has one of the several bolts bearing this latter which are used to carry the dust guards J from the bearings.

The feed hopper consists of a casting having a receiving chamber $t^2$ above its gate $u^2$, bifurcated legs $v^2$ below these, and a flange $y^2$ which is planed on its under face to rest on the top $e^1$ of the casing, and projects over this face and the top of the feed chutes, which latter it supports by bolts passing through this flange and the finished top flange $z^2$ of the chutes, thus suspending the latter from the hopper.

The feed chutes are tubular castings of curved or angular formation, which extend outwardly from the feed hopper far enough to clear the guide bars M and then downwardly, and then inwardly through the adjacent cheek-piece at the proper angle to discharge the feed on to the inner face of the ring above the feed roll. The upper portion $a^3$ of each chute preferably corresponds in angularity with the adjacent leg of the hopper. Beneath this the chute descends vertically and has a front opening $b^3$ which is closed by a hand plate, below which the chute has an angular tubular portion $c^3$ leading into the mill. A feed chute can be removed and another one substituted in case of wear.

When the improved flaring ring is used it is desirable to limit the motion of the ring to a predetermined extent in order to avoid unnecessary contact with the cheek-pieces, and permit the latter to be close to the ring without danger of binding. For this reason I provide means for limiting this movement or reducing the tendency to excessive movement. This may be variously accomplished, but I prefer in the construction shown to confine the pressure springs S within predetermined but adjustable limits of expansion, while leaving them free for additional compression, and then to set the pressure screws against them so that the rolls will be properly disposed under their tension. I prefer to do this by clamping the springs with a compression collar Q. which collar is held toward the casing by an adjustable bolt R and is free to move inwardly along this bolt, and on which the spring washer T bears, so that the reaction of the spring against the washer is effective until the spring expands sufficiently to bring its compression plate against the head of the bolt, whereupon its expansion is arrested, and tendency to move the bearing frame farther outwardly ceases. This adjustment should be made so that the effective action of the spring will cease before the ring quite contacts with the cheek-pieces at the point diametrically opposite each spring. The opposite movement of the frame toward the casing may be limited by so proportioning the parts that the spring washer will strike the head of the bolt R and arrest inward movement of the frame, or that the springs will entirely collapse and prevent such movement, or by providing other suitable stops or provisions giving the requisite lost motion, but adapted to prevent an undue excess of motion in one or both directions. The spring stop V which the frame moves inwardly against arrests it yieldingly to limit inward motion in the construction shown. The bolt R limits expansion of the spring S.

According to another feature of improvement undue side motion of the ring is checked by providing one or more rolls on the ring, and a stationary track on the shell or the cheek-piece or side cover. As shown, three rollers W are rotatively mounted on the ring, and an annular track $W^1$ is formed on each cheek-piece, the transverse plane of the track being such as to intersect the axis of the ring at its center, and the edge of each roller being correspondingly beveled. The roller only touches the track in case of excessive movement of the ring, and the contact is normally only momentary. The connection and location of the roller on the ring may be effected in any suitable way, t I prefer to form the ring with a transverse hole $e^3$, and drill and tap a radial hole communicating with this, into which is screwed the stud $f^3$ on which the roller is mounted, so that this stud can be cottered or otherwise fixed against loosening. The roller is formed with a screw-threaded hub, and a cap $g^3$ inclosing the head of the stud screws on this hub and is locked thereon by a spring $j^1$ or otherwise. The cap $g^3$ is filled with heavy grease before being screwed on, thus excluding ingress of dust around the stud.

The dust guards J are a plain oblong plate bored to fit the shaft, and sufficiently greater in size than the shaft slots to keep the latter closed during ordinary movements of the bearings. They are supported from their respective bearings by the bolts $l^3$, which are pressed toward them by springs $l^3$ which force the ends of the bolts into the holes in the dust guards. On the caps for the top bearing, lugs $h^3$ are especially cast to carry the bolt $l^3$, and on the frames a similar lug $m^3$ is cast, these lugs being diametrically opposite and equidistant from the axis of the bearing, so that they correspond in relation to the dust guard with the pivotal bolt for the lower oil well caps $P^1$, thus permitting the dust guards to be all alike.

To more tightly press the dust guards against the cover or cheek-piece, I provide side plates $u^3$ which are pressed against the side of the dust guards by springs $v^3$ carried by bolts $w^3$ screwing into the cover. The lip $m^1$ of the cover is formed with projecting portions $s^3$ against which the pressure plates $u^3$ seat. Holes $y^3$ are drilled through the dust guards, and the ends of the bolts $l^3$ enter these holes for supporting the dust guards and transmitting to them the movements of the bearing.

According to other improvements the rolls are differently constructed in their attachment to the shafts. The top roll C has a cylindrical bore $a^4$ and the shaft a cylindrical enlargement $b^4$, and the adjacent parts have tapering keyways $c^4$ in which are driven oppositely tapering keys $e^4$ for fixing the parts tightly together and preventing rotation. The shaft has a projecting flange $f^4$ through which the keys pass, and the small ends of the keys are screwthreaded and each carries a nut $g^4$ which bears against the flange and holds the key in place. A collar $h^4$ having pockets fitting over the nuts, prevents them from unscrewing. Bolts $i^4$ traversing this collar and passing through transverse channels $j^4$ in the inner face of the roll, hold the collar $h^4$ in place and draw a collar $l^4$ toward the opposite face of the roll. The collar $l^4$ has tapered faces $m^4$ engaging the beveled ends of the keys for holding them in place. The roll is preferably a segment of a sphere, its outer periphery being concentric with its center. Its outer surface is chilled, and its flat side walls between this surface and its bore are formed with annular or other suitable sledging faces $n^4$, by which it can be driven on the shaft without danger of chipping its edges, which are very brittle. Three keys and three bolt channels are shown in Figs. 24, 25 and 26, as the preferred construction for securing the top roll to its shaft, this construction being best for this roll, owing to its being the driving roll of the machine shown.

The feed roll $C^1$ is that requiring most frequent renewal, and is preferably constructed as shown in Figs. 27, 28 and 29.

Its shaft $D^1$ has a tapering seat $b^5$, terminating in a flange $f^5$, and the roll has a tapering bore $a^5$ fitting the seat and meeting the flange. Near its center the roll has a cavity $c^5$ from which toward its other side it has an outwardly flaring or reverse tapered bore $d^5$. A split cone $e^5$ having an inner taper fitting the shaft and an outer taper fitting the bore $d^5$, is forced into the large end of the roll by transverse bolts $i^5$ which traverse channels $j^5$ in the roll and pass through the flange $f^5$.

The rear roll $C^2$ which needs to be renewed less frequently than the others, is constructed as shown in Figs. 30, 31 and 32, where the shaft is of uniform diameter up to its central flange $f^6$, and the roll has outwardly flaring bores $a^6$ $b^6$ and an intermediate shoulder $c^6$ which fits against the flange $f^6$. A split collar $d^6$ having a cylindrical inner bore and a tapered outer bore, is forced in one side of the roll, and a similar collar $e^6$ of smaller outer diameter is forced in the other side of the roll. Bolts $g^6$ traversing both collars and the flange $f^6$, draw the collars $d^6$ home, and bolts $h^6$ traversing the flange and the collars $e^6$ draw the latter home. The latter bolts tend to hold the shoulder $c^6$ of the roll against the flange $f^6$ of the shaft, thus holding the roll in its central position. The cone $d^6$ has sockets $i^6$ for the heads of the bolts $h^6$ to prevent rotation of the latter.

In each of these constructions it will be noted that the method of attachment tends to hold the roll against the flange on the shaft, so that the roll will occupy a fixed position longitudinally of the shaft; also that each construction tends to insure that the roll shall be concentric with the axis of the shaft.

Another feature of improvement relates to positioning the rolls axially relatively to the non-rotative parts, and preferably provides for movably, yieldingly and elastically, axially holding each roll, and means therefor preferably also serving as the thrust collars and dust protectors for the bearings, which means are preferably constructed as illustrated in Figs. 36, 37, 38 and 39. Preferably two thrust collars are used, one, X, at the inside of each bearing, and the other, Y, at the outside of each bearing, and each is spaced apart from the bearing so that the shaft can move axially of the bearing, and springs reacting against these collars and the bearing resist such movement, as best seen in Fig. 36. The shaft is formed with a shoulder $a^7$ beyond the bearing, and a reduced portion $b^7$ within the bearing, and a groove $c^7$ at the outer end of the bearing, and the outer faces of the bearing are surrounded by a projecting planed portion $d^7$, outwardly of which is an annular yielding packing $e^7$ seated in a socket cast in the end of the bearing. The collar X is bored to fit over the shaft and against the shoulder $a^7$, and is split partway through adjacent to this shoulder and clamped on the shaft by a bolt $f^7$ the head of which is prevented from turning by a shoulder $g^7$ on the collar. The collar has a projecting flange $h^7$ over which fits the flange of a ring $i^7$ which bears against the end of the bearing, making a running joint therewith, and a tight joint against the elastic packing $e^7$, as shown in Fig. 36. The edge of the ring is beveled, and it has a projecting flange which fits slidingly over the flange $h^7$. The ring is bored to fit the shaft, and its inner face is opposite the inner edge $j^7$ of the collar X. Pockets $k^7$ are formed in the collar X, and lugs $l^7$ are cast on the ring and project into these pockets, and springs $m^7$ between the collar and ring within these pockets and between the lugs, tend to force the ring toward the bearing see Figs. 36 and 37. The collar is fixed relatively to the roll and is spaced from the bearing and has a slight play relatively to the ring, so that the shaft can have the desired end play, the springs keeping the ring always against the bearing as the collar slides in the ring. The lugs on the ring cause it to revolve with the collar. Thus the end of the bearing is always kept closed against ingress of dust and the collar and parts carrying it are always subject to the reaction of the springs.

Although the collar is filled with heavy grease before the parts are assembled, which practically seals the joints between the parts, I prefer to use an additional packing Z (see Fig. 39) in the nature of a cupped leather packing, which consists of a piece of leather or fiber wired into a groove surrounding the collar at such a point that the flange of the ring will overlap it, and that it will act to prevent ingress in case of suction when the parts are separated.

The thrust collar Y is similar to the thrust collar X, except that it is constructed in halves which are bolted together to permit its being seated in the groove. In this case the lug on the ring is a solid lug. In other respects the parts are substantially identical in construction and operation except that the direction of the reaction of the springs against the collar Y is opposite to that of those against the collar X to balance the effective forces when normally positioned.

In both collars the bolts are prevented from unscrewing by the projection $g^7$, which engages the nut on the bolt, and the projection $o^7$ which engages the cotter $p^7$ traversing the bolt, thus preventing both the nut and the cotter from rotating.

In use, the ring, in assembling the machine, will be put in the mill through one side or the other, or the ring through one end or the other and the rolls and their shafts through the side, the cheek-pieces will be fastened in place, the covers applied, the pressure plates $k$ will be attached, the frames with their pressure springs applied, the bearing caps drawn home against the frames to secure the shafts in their bearings, the guide plates attached in position, the guide links N connected, the feed chutes and hopper applied, and the mill adjusted ready for running. To remove a cheek-piece or any of the internal parts, the roll shafts will be disconnected from their bearings, links N will be uncoupled from the frames K and these frames will be moved back until the faces of their bearing ends clear the attached parts at the side of the casing, these parts (the plates M and covers H) will be disconnected and the desired parts will be removed and others substituted, after which the various parts will be re-assembled.

It will be seen that my invention provides improvements which can be variously and advantageously availed of, and it will be understood that the invention is not limited to the particular details of construction, arrangement, combination or use hereinbefore set forth as constituting its preferred form, since it can be employed in whole or in part according to such modifications as circumstances or the judgment of those skilled in the art may dictate, without departure from the spirit of the invention.

One such modification is shown in Figs. 33 and 34, in which the shaft has a central enlargement $a^8$, and the roll lettered $C^8$ is cylindrically bored and seats against a shoulder $b^8$ on one side, the shaft on the other side of the roll being formed with a groove $c^8$ terminating in a shoulder $d^8$, between which and the roll are locking blocks $e^8$ which are held in position by a tapered collar $f^8$, which embraces them and is held toward the roll by bolts $g^8$ traversing the roll and engaging a collar $h^8$ surrounding the shaft at the outer side of the shoulder $b^8$.

Another modification is shown in Fig. 35, in which the shaft is formed with a groove at the side of the roll having a beveled shoulder $a^9$, and a split collar $b^9$ is clamped in this groove and has a beveled face engaging the shoulder and held thereby toward the side of the roll to prevent displacement of the latter, and hold it against the shoulder $c^9$ at the other side of the roll seat.

Another modification is shown in Figs. 40 and 41, in which the bearing frames K are guided against rocking longitudinally of the shafts by rollers $a^{10}$, which are bolted to the sides of the frames, either at fixed points or at yieldingly connected parts, to give the frames a slight end play in case it is desired to omit the end play from the thrust collars. The rollers $a^{10}$ bear against finished portions or tracks $b^{10}$ on the sides of the casing $A^1$ or its covers or check-pieces $Z^1$, which will preferably be flush with the lips surrounding the shaft slots, and machined to a definite distance relatively to the center of the casing. In this construction the bearing ends of the lower frames are supported vertically by rollers $c^{10}$ which are pivotally mounted on the side walls of the casing, or the cover or check-piece $Z^1$ thereof, and the outer part of the top frame is supported at both sides by rollers $d^{10}$ at front and rear of its edges, which are formed with planed tracks or bearing portions $e^{10}$ for these rollers. The rollers $d^{10}$ are mounted on the casing or outward projections therefrom, and have flanges $f^{10}$ which project inwardly of the portions $e^{10}$ and prevent lateral sway of the outer portions of the top frame. The bearing portion of the top frame is united by a link $N^1$ which straddles the casing and is pivoted to a projection $g^{10}$ on the outer wall thereof, which insures equal vertical movement of the opposite bearings. The lower frames are pivoted near their outer parts to U-shaped links $N^2$ and $N^3$ respectively, which are fulcrumed the one to a hollow projection $h^{10}$ on the base, and the other to a flange $i^{10}$ on the base, these links insuring parallel motion of the lower bearings respectively. In this way proper freedom of movement is obtained with very few parts, and great simplicity of construction, and without sacrificing the parallelism of the shafts, which is desirable to this character of machine.

What I claim is:—

1. The combination with a revolving annular die, a crushing roll therein, a casing inclosing said parts, and a movable bearing for said roll, and means movably supporting said bearing, of a guide for said bearing disposed between the inner face of the latter and said casing and attached at its end to said casing and crossing said bearing.

2. The combination with a revolving annular die, a crushing roll therein, a casing inclosing said parts, and movable bearings for said roll at opposite sides of said casing, and means movably supporting said bearings, of a member attached to said casing for guiding said bearings extending between the inner face of the latter and said roll for limiting inward movement of said bearings axially of said roll.

3. In combination, an annular revolving crushing die having an internal crushing face, a rotatable and axially movable crushing roll within and eccentric to said die having a peripheral crushing face reciprocal to the inner face of the latter, means for revolving one of said parts, a casing for said parts, a non-rotative member revolubly carrying said roll, and means yieldingly positioning said roll axially relatively to said non-rotative member.

4. In combination, a revolving annular crushing die having an internal crushing face, a movable and rotatable crushing roll within and eccentric to said die having an external crushing face reciprocal to the internal face of the latter, means for revolving one of said parts, a casing for said parts, a non-rotative movable member carrying said roll, means holding said roll outwardly toward the inner face of said die to resist a crushing pressure therefrom and means positioning said movable member relatively to said casing consisting of a member pivotally connected to one of said parts and moving in contact with the other of said parts.

5. The combination with a revolving annular die, a crushing roll therein, a casing inclosing said parts, and a movable bearing for one of said parts, of means movably supporting said bearing, and a bar attached to said casing after its extremities, extending past the external walls of said bearing, and movably positioning the latter.

6. The combination with a revolving annular die, a crushing roll therein, a casing inclosing said parts, and a movable bearing for one of said parts, of means movably supporting said bearing, and a bar attached to said casing, extending across said bearing, and antifriction rolls on one of said parts engaging and positioning the other of said parts movably from it.

7. The combination with a revolving annular die, a crushing roll therein, a casing inclosing said parts, and a movable bearing for said roll, of means movably supporting said bearing, and a member separably attached to said casing and having removable portions engaging the edge and the end of said bearing for limiting motion of the latter relatively to said die.

8. In combination, a revolving annular crushing die having an internal crushing face, a movable and rotatable crushing roll within and eccentric to said die having an external crushing face reciprocal to the internal face of the latter, means for revolving one of said parts, a casing, a non-rotative movable member carrying said roll, means holding said roll outwardly toward the inner face of said die to resist a crushing pressure therefrom and means positioning said non-rotative movable member relatively to said casing consisting of a roller connected to one of said parts and rolling in contact with the other of said parts.

9. The combination with a revolving annular die, a crushing roll therein, a casing inclosing said parts, and a movable bearing for said roll, of means movably supporting said bearing, and a guide for said bearing consisting of a member having a central guiding portion and having extremities attached to said casing, and having a plurality of recesses in its inner face for giving access to the side of the casing.

10. The combination with a revolving annular die, a crushing roll therein, a casing inclosing said parts, and a movable bearing for said roll, of means movably supporting said bearing, and a guide for said bearing consisting of a member having extremities attached to said casing, and having a recess in its inner face for receiving said bearing.

11. The combination with a revolving annular die, a crushing roll therein, a casing inclosing said parts, a bearing frame having a bearing for said roll at the side of said casing and a portion extending outwardly of said casing, and means movably supporting said frame, of a guide for said bearing frame consisting of a member fulcrumed to said casing and to the outer portion of said frame remote from its bearing.

12. The combination with a revolving annular die, a crushing roll therein, a casing inclosing said parts, and bearings for one of said parts at opposite sides of said casing, of a frame uniting said bearings and crossing the exterior of said casing, means movably supporting said frame, remote from said bearings, and a pivoted connection between the outer part of said frame and said casing consisting of a swinging member guiding said frame.

13. The combination with a revolving annular die, a crushing roll therein, a casing inclosing said parts, and movable bearings for said roll at opposite sides of said casing, of a frame connecting said bearings, means movably supporting said frame, and a guide for said frame fulcrumed to said casing and to the outer part of said frame.

14. The combination with a revolving annular die, a crushing roll therein, a casing inclosing said parts, and movable bearings for said roll at opposite sides of said casing, of a frame rigidly connecting said bearings and extending around the exterior of said casing, means movably supporting said frame, and guides at opposite sides of said frame fulcrumed to said casing for guiding said frame therefrom.

15. The combination with a revolving annular die, a crushing roll therein, a casing inclosing said parts, and movable bearings for said roll at opposite sides of said roll, of a frame rigidly connecting said bearings and extending across the outside of said roll, means movably supporting said frame, and a guide for said frame connected thereto at opposite sides thereof, and fulcrumed to said casing.

16. The combination with a revolving annular die, a crushing roll therein, a casing inclosing said parts, and movable bearings for said roll at opposite sides of said casing, of a frame connecting said bearings and extending across the exterior of said casing, means movably supporting said frame, means guiding the bearing ends of said frame, and a link fulcrumed to said casing and the outer end of said frame for supporting and guiding the latter from the casing at such relative points that the weight of said frame tends to cause the link to swing outwardly and thus utilizes the weight of the frame to press said roll against said die.

17. The combination with a revolving annular die, a crushing roll therein, a casing inclosing said parts, and a movable bearing for said roll, of a member attached to said casing for guiding the inner end of said bearing, a frame extending from said bearing outwardly, means movably supporting said frame, and a member fulcrumed to said casing and to the outer part of said frame for guiding the outer end thereof.

18. The combination with a revolving annular die, and a crushing roll therein having bearings at its opposite sides, of a casing inclosing said die and roll, and having bearing portions near its opposite sides, a frame connecting said bearings and extending across said casing, means movably supporting said frame, a link fulcrumed to said casing between said bearing portions and connected to the outer part of said frame, and means for guiding the inner part of said frame.

19. In combination, a revolving annular crushing die having an internal crushing face, three or more movable and rotatable crushing rolls within eccentric to and each having an external crushing face reciprocal to the inner face of said die, means for revolving one of said parts, a plurality of non-rotative pivotally mounted members carrying said rolls respectively, a casing for supporting said parts having pivotal provisions outwardly thereof, a member pivotally engaging and swinging on said pivotal provisions, and pivotally connected to one of said non-rotative members, and means pressing said rolls apart and toward the inner face of said die to resist a crushing pressure therefrom.

20. In combination, an annular crushing die revolving in an approximately vertical plane and having an internal crushing face, three or more movable and rotatable crushing rolls swinging toward and from each other within and eccentric to said die and each having an external crushing face reciprocal to the internal face of said die, means for revolving one of said parts, a casing for said parts, swinging non-rotative members carrying said rolls respectively, and means connected to said casing and pivotally connected to said members for positioning them, and means pressing said rolls away from each other and toward the inner face of said die to resist a crushing pressure therefrom.

21. In combination, a revolving annular crushing die having an internal crushing face, a plurality of movable and rotatable crushing rolls within eccentric to and each having an external crushing face reciprocal to the internal face of the die, means for revolving one of said parts, a casing for said parts having an open side, a plurality of movable non-rotative members movable away from the open side of said casing and each carrying one of said rolls, means pivotally connecting said non-rotative members to said casing, and means pressing said rolls apart toward the inner face of said die to resist a crushing pressure therefrom.

22. The combination with a revolving annular die, a crushing roll therein, bearings for said roll at the sides of said die, a bearing frame connecting said bearings, and a spring pressing said frame outwardly, of a casing containing said die and roll and having an aperture $h$ in its outer wall opposite said spring, and a separable plate $k$ between said spring and casing and mounted over said aperture for receiving the reaction of said spring.

23. The combination with a casing having an aperture $h^2$ through its side, and a cheek-piece entering and of less size than said aperture and having a portion overlapping and attached to the outer side of said casing.

24. The combination with a casing having an aperture $h^2$ through its side wall, of an apertured cheek-piece smaller than and passing through said aperture and attached to the outer wall of said casing, and a cover closing the hole through said cheek-piece.

25. The combination with a casing having an aperture $h^2$ through its side wall, of an apertured cheek-piece entering said aperture and fastened against the outer face of said side wall, said piece and casing having a plurality of differential interengaging provisions preventing application of said piece to said casing in other than a predetermined position.

26. The combination with a casing having an aperture $h^2$ through its side wall, of an apertured cheek-piece entering said aperture and carried by said casing, and a cover for the opening through said cheek-piece and attached to the outer face of the latter.

27. The combination with a casing having a circular opening through its side wall, of a cheek-piece having an opening through it and entering said opening and having a face on its inner wall fitting against the outer face of the wall of the casing, and having a face on its outer wall, and a movable cover for said cheek-piece fitting against the outer face thereof.

28. The improved cheek-piece for crushing machinery, consisting of an annular member having an annular outwardly beveled contact face, in combination with a revolving die having a reciprocal face opposite said contact face.

29. The improved cheek-piece consisting of an annular member having an outwardly recessed annular contact face on one side, in combination with a revolving annular die opposite said face.

30. The improved cheek-piece consisting of a single integral member having an arc-shaped outwardly beveled contact face on one side, and an inlet aperture inwardly of said face, in combination with a revolving annular die opposite said face.

31. The improved cheek-piece consisting of a member having an arc-shaped beveled contact face, and an outwardly extending portion having attaching provisions outwardly of said face, in combination with a revolving annular die opposite said face.

32. The improved cheek-piece consisting of a member having an arc-shaped beveled contact face on its inner side, an outwardly inclined body beyond said face having means for attaching it to the casing, and an inwardly inclined outer face, in combination with a revolving die opposite said contact face.

33. The improved cheek-piece consisting of a ring-like member having an arc-shaped beveled contact face on its inner side, having a transverse recess through said face near its lower portion, and having attaching provisions outwardly of said face, in combination with a revolving die opposite said contact face.

34. The improved cheek-piece consisting of a ring-like member having a concavo-convex body, a beveled hardened contact face on the convex side of said body, attaching provisions outwardly of said face, an inlet recess intersecting said face, and an egress recess interrupting said face near its lower portion, in combination with a revolving die opposite said contact face.

35. The improved cheek-piece having a projecting contact face, a receding flange, and an attaching face on one side and having on the opposite side a concave portion, and a face for a cover in such portion, in combination with a revolving die opposite said contact face.

36. The combination with a crushing roll, of the improved annular die consisting of a ring having a concave annular track, and outwardly inclined integral side walls at the sides thereof.

37. The combination of a crushing roll, of the improved annular die consisting of a member having a concave annular track and inwardly inclined integral side walls outwardly thereof.

38. The combination with a crushing roll, of the improved annular die consisting of a member having a concave annular track, outwardly flaring side walls surrounding said track, and inwardly inclined side walls surrounding said outwardly flaring side walls.

39. The combination with a revolving annular die having outwardly flaring side walls, of a crushing roll within said die, cheek-pieces at opposite sides of said die having outwardly inclined contact faces opposed to the side walls of said die, and a casing inclosing said parts.

40. The combination with a radially movable revolving annular die and a crushing roll within said die, of an anti-friction guiding roller carried by and revolving with said die, and a non-rotary annular track surrounding the die opposite said roller.

41. The combination with a shaft having a roll-seat, of the improved roll consisting of a crushing member having a central bore fitting said seat and transverse channels opening thereinto, and means for securing said roll on said shaft.

In witness whereof, I have hereunto signed my name in the presence of two subscribing witnesses.

GEORGE H. FRASER.

Witnesses:
THOMAS F. WALLACE,
THEODORE T. SNELL.